Patented June 16, 1936

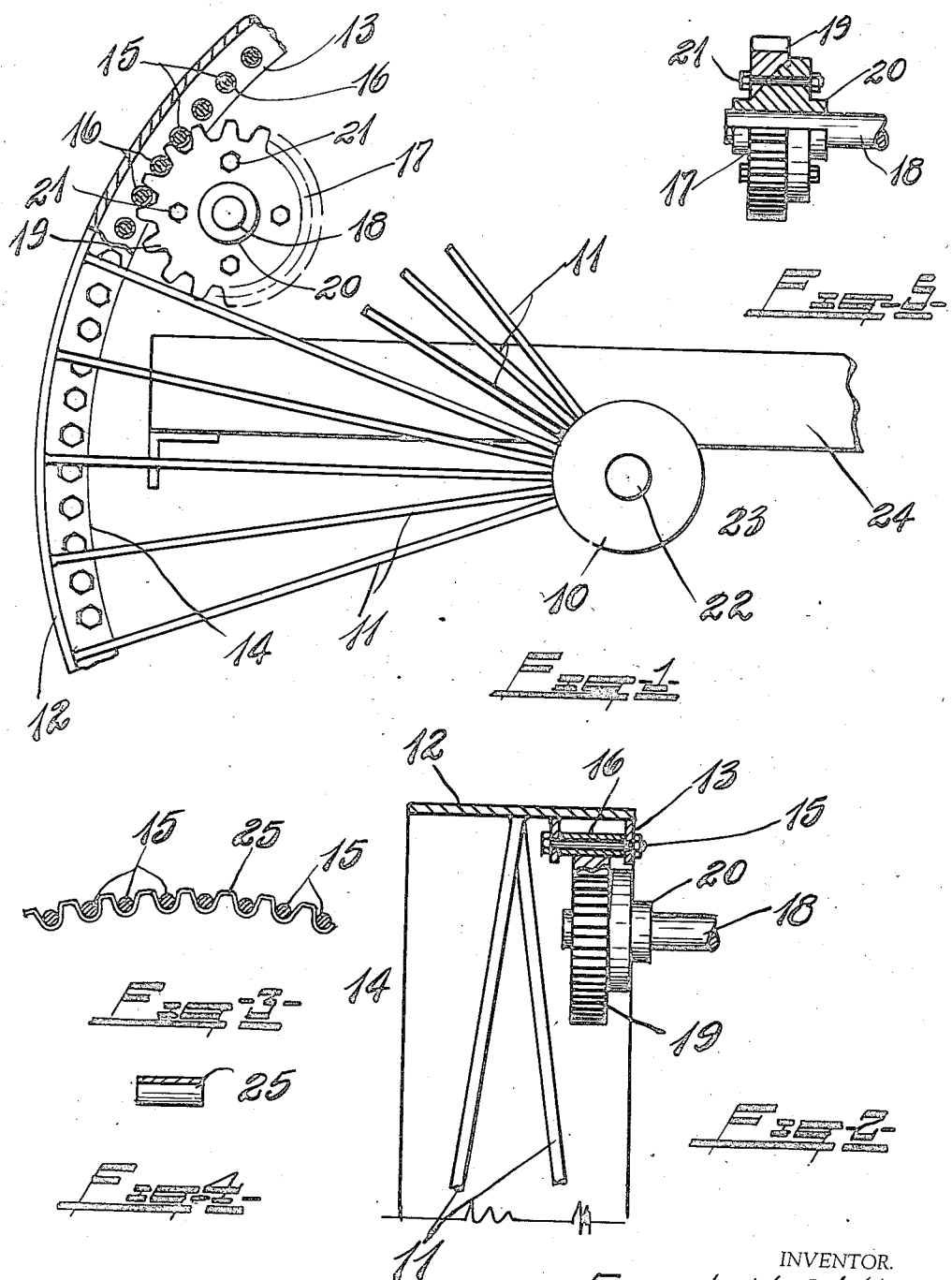

2,044,182

UNITED STATES PATENT OFFICE 2,044,182

AUTOMOTIVE VEHICLE DRIVING MECHANISM

Frank H. Ott, Saginaw, Mich.

Application November 9, 1934, Serial No. 752,319

4 Claims. (Cl. 74—449)

This invention relates to driving mechanism, and more particularly to a driving mechanism for use in connection with tractors and other heavy vehicles.

One of the prime objects of the invention is to design a simple, practical, and economical driving mechanism composed of few parts, all of rugged construction, which can be readily manufactured and assembled, and which will wear for a long period of time.

Another object is to design a driving mechanism, the various parts of which are readily replaceable when worn, and which requires no close tolerances in manufacture.

A still further object is to provide a simple driving mechanism including the driven wheel or member which cooperates therewith, and which has sufficient flexibility to withstand all ordinary twists and strains without binding or in any manner affecting the efficiency thereof.

The above and other objects will appear as the specification progresses, reference being had to the accompanying drawing, in which I have shown the preferred embodiment of my invention, and in which like reference numerals indicate like parts throughout the several views thereof.

In the drawing—

Fig. 1 is a fragmentary side view of a tractor wheel showing my driving mechanism in connection therewith.

Fig. 2 is a fragmentary transverse sectional view through the tractor wheel, showing also the driving gear.

Fig. 3 is a fragmentary side view of the pressed wear strip.

Fig. 4 is a transverse sectional view thereof.

Fig. 5 is a part sectional view of the driving gear.

In the accompanying drawing I have shown a conventional tractor wheel including a hub 10 provided with spokes and rim 11 and 12 respectively as usual, an inwardly extending plate or angle 13 being secured to one edge of the rim, and a similar angle 14 is also secured to the inner circumference of said rim and is spaced a predetermined distance inwardly from the member 13. Transversely disposed bolts 15 are mounted in these angles 13 and 14 in circumferential spaced relation, and a sleeve 16 is mounted on each bolt so as to be freely revoluble thereon, this arrangement of bolts, sleeves, and angles forming an internal gear with which the driving gear 17 engages in the usual manner, said gear being mounted on the drive shaft 18 and is formed in two pieces or sections, the outer toothed ring 19 being mounted on the hub 20 and is secured in position by means of studs 21 so that the toothed ring can be replaced when worn, and this construction further permits the driving mechanism to be easily and quickly uncoupled; it is merely necessary to back off the studs 21 so that the toothed ring can be transversely shifted and removed, or the hub can be shifted longitudinally on the drive shaft, so that gear teeth are out of engagement with the internal gear.

The tractor wheel hub is mounted on an axle 22 as usual, said axle being journaled in bearings 23 which are mounted on the tractor frame 24 in the conventional manner, and while in the present instance I have shown a single wheel, it will be understood that both rear wheels are exactly alike and are driven in the same manner.

In Figs. 3 and 4 of the drawing I have shown a pressed facing strip 25 which fits over the bolts 15 which form the internal gear. This is a pressed construction and closely fits over the bolts or sleeves, it is easily and quickly insertable or removable, is very economical to manufacture, and can be quickly detached and replaced when worn.

From the foregoing description, it will be obvious that I have perfected a very simple, practical, and rugged driving mechanism which is economical to manufacture, and which is readily removable and replaceable when worn.

What I claim is:

1. A driving mechanism, and comprising a ground engaging wheel including a rim provided with spaced apart, inwardly projecting flanges, circumferentially spaced bolt members removably mounted in said flanges and forming teeth, a flexible strip fitted over said bolts, and a drive gear engageable with said members for driving said wheel.

2. A driving mechanism for automotive vehicles, and including a wheel, inwardly extending flanges secured to said wheel in spaced apart relation, transversely disposed bolts removably mounted in said flanges in spaced relation, and forming teeth, a removable, flexible strip fitted over said bolts, and a drive gear meshing therewith for driving said wheel.

3. A driving mechanism, and including a wheel, spaced apart inwardly projecting flanges secured to the inner surface of the wheel rim and having a plurality of spaced apart bolts mounted therein and forming teeth, a flexible strip fitted over and forming a facing for the teeth, and a sectional drive gear engageable with said teeth for driving said wheel, said sectional gear comprising a hub portion with a toothed ring removably mounted thereon.

4. A driving mechanism for automotive vehicles and including a wheel, inwardly projecting flanges secured to the wheel rim in spaced apart relation, a plurality of circumferentially spaced bolts removably mounted therein and forming an internal gear, removable detachable means fitted over and forming a wearing face for said internal gear, and a sectional drive gear meshing with said internal gear for driving said wheel, said gear comprising a main hub having a toothed ring removably mounted on said hub.

FRANK H. OTT.